United States Patent [19]

Virnot

[11] Patent Number: 4,533,918
[45] Date of Patent: Aug. 6, 1985

[54] PILOT ASSISTANCE DEVICE

[76] Inventor: Alain D. Virnot, 21 Rue des Canettes, 75006 Paris, France

[21] Appl. No.: 338,456

[22] Filed: Jan. 8, 1982

Related U.S. Application Data

[63] Continuation-in-part of Ser. No. 127,060, Mar. 4, 1980, abandoned.

[30] Foreign Application Priority Data

Mar. 8, 1979 [FR] France .................................. 79 05989

[51] Int. Cl.³ .......................... G01S 1/68; G01F 15/50
[52] U.S. Cl. ................................. 343/451; 343/5 DP; 343/463; 343/386; 364/456; 364/460
[58] Field of Search ................... 343/5 MM, 450, 451, 343/5 DP; 364/460, 461, 449, 456

[56] References Cited

U.S. PATENT DOCUMENTS

| 3,659,085 | 4/1972 | Potter et al. | 364/460 X |
| 3,869,601 | 3/1975 | Metcalf | 364/460 X |
| 3,974,328 | 9/1976 | Thomas et al. | 343/5 MM |
| 4,117,482 | 9/1978 | Jepsky et al. | |
| 4,163,972 | 8/1979 | Lapy et al. | 364/461 X |
| 4,179,693 | 12/1979 | Evans | 343/5 MM |
| 4,232,313 | 11/1980 | Fleishman | 343/6.5 R X |

Primary Examiner—Theodore M. Blum
Assistant Examiner—Gilberto Barrón, Jr.
Attorney, Agent, or Firm—Charmasson & Holz

[57] ABSTRACT

A device working in conjunction with commercial-grade radar equipment for accurately pinpointing the location of a target or a topological feature with a precision greatly superior to the specified resolution of the radar equipment.

This high precision is obtained through on-line treatment of the radar echo signals as the radar scans the target area.

In the preferred embodiment of the invention, the device is used for assisting a pilot in steering a ship navigating through coastal or inland waterways. The device provides statistically weighted data relative to the location of a plurality of landmarks in the vicinity of the ship to a KALMAN filter-type circuit which in turn generates an accurate state vector reflecting the ship's present and near future movement.

In the course of an initial surveying pass through the waterway, the device can also generate reference charts of the area to be traveled.

The device can also be applied to other types of surveying tasks, to the implementation of anti-collision apparatuses, and to other systems requiring a high degree of precision in the measurement of surrounding objects.

18 Claims, 14 Drawing Figures

PILOT ASSISTANCE DEVICE

PRIOR APPLICATION

This application is a continuation-in-part of application Ser. No. 127,060 filed Mar. 4, 1980 abandoned.

FIELD OF THE INVENTION

The instant invention relates, first, to methods and devices for enhancing radar-generated images. It also relates to navigation aids and automatic pilot systems.

BACKGROUND OF THE INVENTION

While the radar is one of the most practical navigational aids due to its ability to provide a relatively accurate outline of surrounding land masses and other topological features, it has never been used as a position reckoning device except by way of extremely complex map-matching techniques, and even so with a relatively poor degree of accuracy. Yet, the radar is a universal tool which can be found on board practically every craft, and is routinely used as a navigational aid in coastal waters as well as inland waterways. Prior efforts in enhancing the quality of radar measurements have been focused for the most part on clarifying the radar image itself without taking full advantage of the inherent accuracy of the echo timing principle upon which this instrument operates. One may realize that by focusing the radar measurements on one or a few particular topological features out of the surrounding area and by means of repetitive samplings, one may achieve a high degree of accuracy in determining the distance and bearing between the radar and selected features. From these measurements and some reference to the geographical location of these features, the exact position of the measuring instrument can be determined, as well as its movement if the radar happens to be installed on board a moving craft.

Such an improvement could greatly increase the usefulness of the radar in helping a pilot steering a ship along a predetermined path by providing a very accurate indication of not only the instant position of the ship but also its anticipated response to a steering maneuver. Such a device can also become a practical surveying tool replacing the traditional sighting methods. For example, a craft equipped with such a device could, in the course of a single travel through an inland waterway, accurately survey recent changes due to accretion or erosion. The same measurements could be made in coastal waters to accurately survey the effect of erosion on the shoreline.

The precision so added to the radar measurements may also be useful in improving its use as an anti-collision device between moving crafts.

Large ships which navigate through inland waterways, either singly or while pulling or pushing convoys of barges, must adhere very narrowly to a predetermined path. Any departure by its center of gyration from the intended path is, due to the size of the ship and the length of the convoy, greatly amplified and may result in a collision, or in one of the barges or the ship itself running aground. The pilot must therefore be provided with an accurate means of determining the exact position of his craft in relation to the centerline of the navigable channel.

SUMMARY OF THE INVENTION

The principal object of the invention is to provide a means for improving the measurement accuracy of an ordinary radar, or any other device repetitively providing signals from which an image of the surrounding topography can by synthesized.

Another object of the invention is to provide a means for accurately pinpointing the location of a particular target, landmark or reference point in relationship to the position of the measuring instrument.

A further object of this invention is to provide means for interpreting said position and location relationship in order to determine the exact movement of a moving craft carrying said measuring instrument.

Yet another object of the invention is to provide such improved accuracy by manipulation of the measurement signals generated by the instrument without affecting the general operation of the surveying apparatus.

These and other objects will become apparent through the following specification which discloses a preferred embodiment of the invention in an application designed to assist a pilot in steering a ship along a predefined path through a waterway.

BRIEF DESCRIPTION OF THE DRAWING

FIGS. 10–11 represent de-blurred views;

FIG. 12 is the diagram of a convolution pattern;

DESCRIPTION OF THE PREFERRED EMBODIMENT OF THE INVENTION

Figure 1:
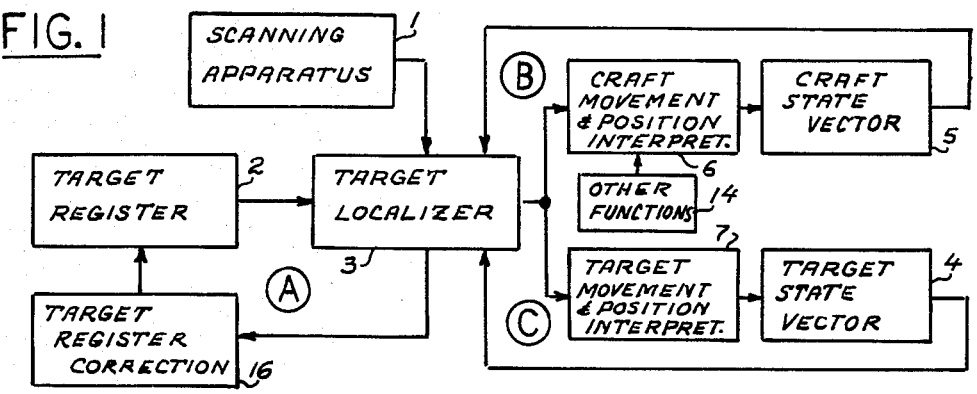
FIG. 1 is a general functional block diagram of the preferred embodiment of the invention.

FIG. 1 illustrates a general functional diagram of the invention in which block 1 represents a scanning apparatus such as a radar or any other device capable of producing signals from which an image of the surrounding topography can be derived. Block 2 is a register which carries the locations and characteristics of some particular targets such as remarkable topological features, isolated buildings, buoys, a shoreline, or even a specially installed radar reflector. Block 3 represents the analyzing and enhancing process from which the relative position of the target in relation to the scanning apparatus can be accurately defined. Block 16 represents the updating of the position information contained in the target register in accordance with the location defined through the process of Block 3. The processes illustrated in loop A comprising the block just described may be used, for instance, in surveying a particular area in order to record changes which have occurred in certain aspects of the area topography. In such case, the target register would contain the location of those features as initially determined from a map or from previous surveys.

Loop B which comprises blocks 3, 6, 5 and 14, illustrates an application of the invention to the determination of the exact movement and position of a moving craft in relation to the relative locations of the targets as they are sampled during the movement of the craft. Block 6 represents the process of interpretation of the various target location measurements issued by the target localizer 3. Block 5 represents the state vector which is obtained from said interpretation. Block 14 illustrates various other functions which may be entered into the position/movement interpreter to provide a more complete definition of the state vector 5. In such application, it is necessary to provide the target localizer 3 with an instantaneous status of the craft's movement and position in order to help the device in selecting the target or targets to be measured. It should be understood that the application illustrated in loop B can be practiced without updating the target register 2 through the process illustrated in block 16.

Loop C which comprises blocks 3, 4 and 7, illustrates an application of the invention to the determination of the location and movement of a moving target in relation to the position of the measuring apparatus.

Such a system may be applied, for example, in the implementation of anti-collison devices.

Block 7 represents the process of interpreting various target location measurements while block 4 represents the keeping of the target state vector. In this application, the components of target state vector 4 are constantly updated as a function of data derived from the target localizer 3.

Figure 2:
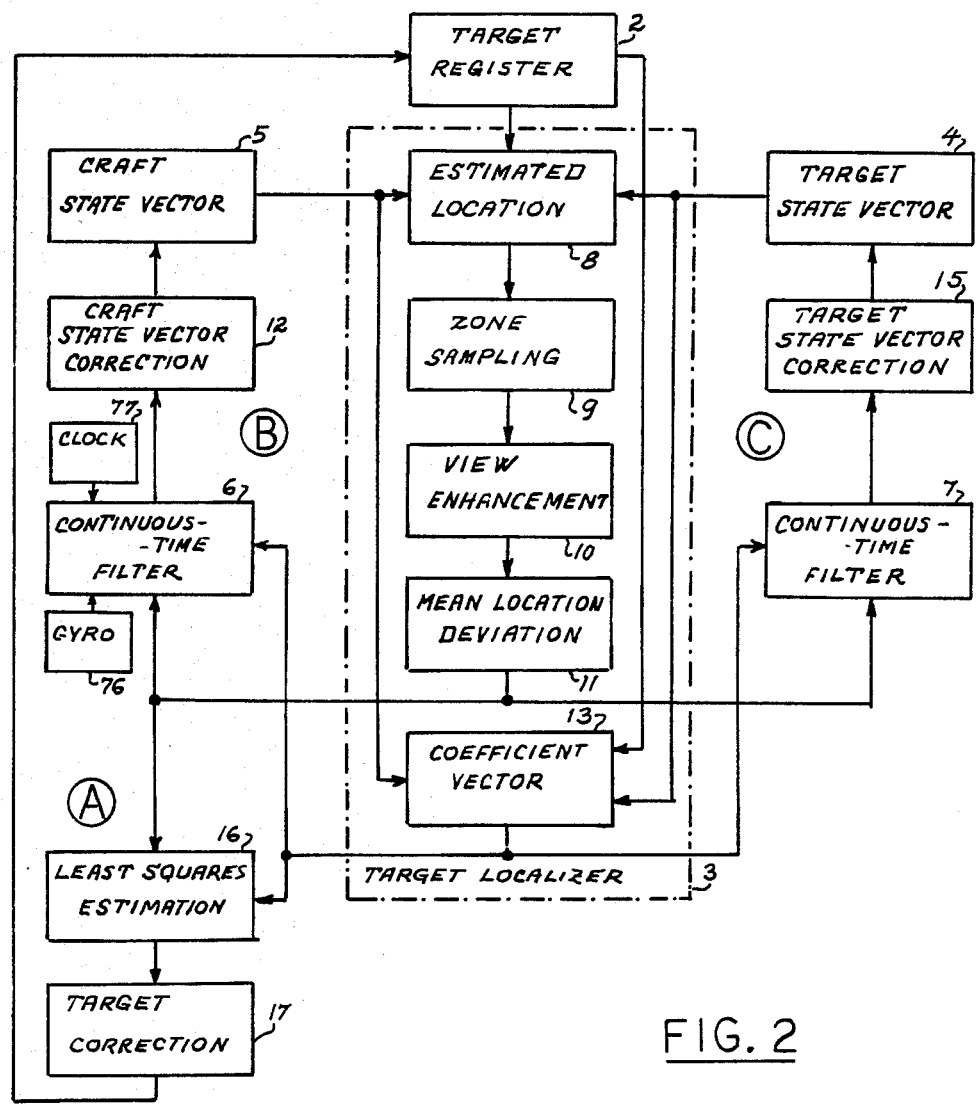
FIG. 2 is an expanded functional block diagram thereof.

FIG. 2 is an expanded functional diagram of the invention in which the target localizer 3 is broken down into its main subcomponents: the estimated relative target location 8, the zone sampling function 9, the view enhancement 10, the computation of the mean location deviation 11 between the various echo samplings, and the computation of a coefficient vector 13 which qualifies the mean location deviation data.

The coefficient vector of observation partials is determined as a function of the craft state vector 5 and either data from the target register 2 in loop A or loop B application, or the target state vector 4 in a loop C situation.

The mean location deviation 11 and its associated variance constitute a Gaussian function which is fed along with the coefficient vector 13 to the various interpretor functions 6, 7 or 16.

In loop A this interpretor comprises a least squares approximation function from which is derived target location correction 17 corresponding to the measurement.

In loops B and C, the interpreter is preferably a continuous-time, i.e., recursive filter from which are derived the state vector components corrections necessary to reflect the results of the measurement.

The craft state vector 5 also receives data from a gyroscope 76 which reflects the rate of rotation of the craft and from a time of the day clock 77. The clock 77 is used to trigger periodical updating of the state vectors as a function of elapsed time.

Figure 3:
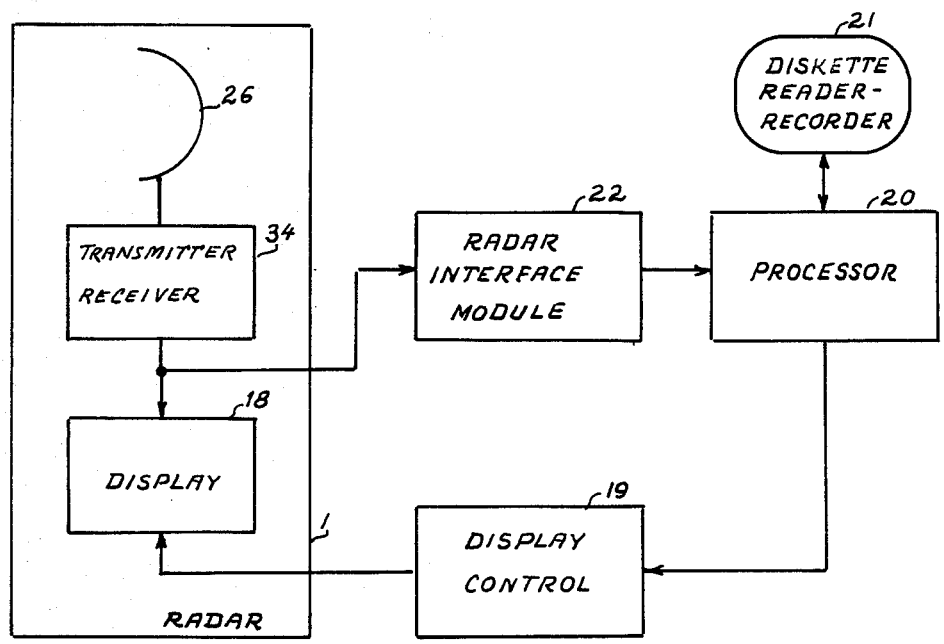
FIG. 3 is a block diagram of the equipment necessary to practice the invention.

FIG. 3 illustrates the block diagram of the hardware used in implementing the preferred embodiment of the invention. A radar 1 comprises scanning antenna 26, a transmitter/receiver 34 and a standard scope display 18. All processes are performed by a programmable processor 20 which cooperates with a diskette reader/-recorder 21 whose diskettes contain the target register 2. A radar interface module 22 is used to perform certain radar signal-gathering functions.

A display control 19 is used optionally to generate a synthetic image of the craft position and other pertinent information to be superimposed upon the radar image of display 18.

Figure 4:
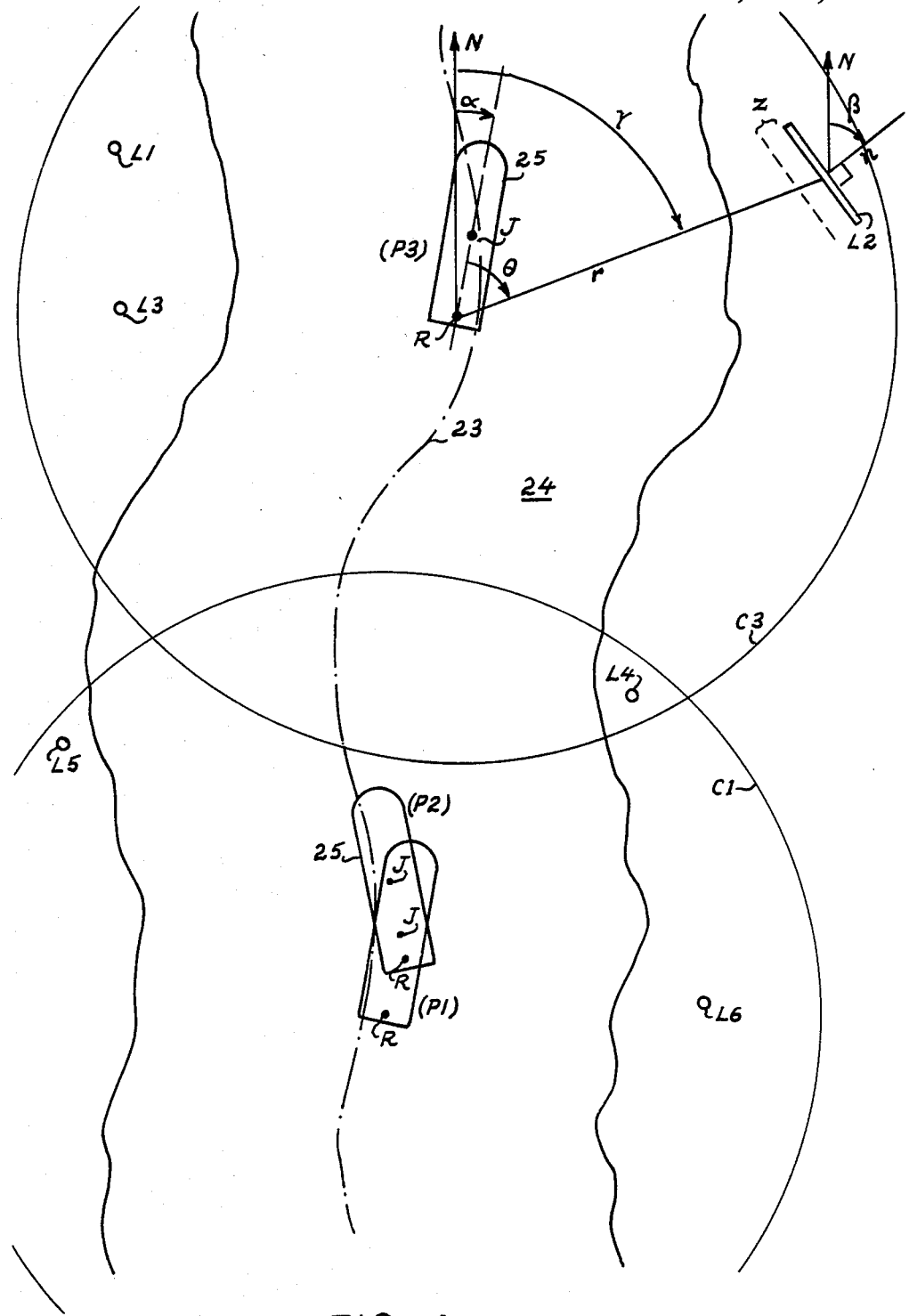
FIG. 4 is a map illustrating application of the invention.

Referring now to FIG. 4, the preferred embodiment of the invention will be disclosed in connection with the navigation of a ship 25 through a narrow channel 24 by adherence to a predetermined path indicated by broken lines 23.

The ship 25 is shown at three positions P1, P2 and P3 within the channel. It is assumed that the radar antenna R is located about the stern of the ship. A plurality of landmarks L1 through L6 have been selected on both sides of the waterway and within the range of the radar indicated by circles C1 and C3 delineating the range of the radar antenna R at positions P1 and P3 of the ship, respectively.

When dealing with large ships, it has been found practical to determine the exact position of the craft and generally speaking, the state vector of the craft with reference to a point which does not necessarily coincide with the location of the onboard radar antenna R.

The pilot can better visualize a reference point if it is chosen to be the center or axis of gyration of the ship in response to the action of the rudder. The practicality of such a selection is illustrated in FIG. 4, and more specifically in reference to positions P1 and P2 of the ship 25. Between these positions, the pilot has turned the helm in order to bring the ship 25 in close alignment with the centerline 23 of the channel 24. This results in bringing the center of gyration J of the ship closer to the centerline 23. However, the radar antenna location R has moved further away from the centerline than it was at the position P1. Accordingly, providing the pilot with an indication relative to the position of the radar antenna R would yield a result contrary to the effect of his maneuver.

The axis of gyration does not always pass through the center of gravity of the ship, but is related to it according to the equation, $$GK \times JG \times m = Ig$$

wherein
G is the center of gravity of the ship,
K is the location of the rudder,
J is the axis of gyration,
m is the mass of the ship, and
Ig is the moment of inertia of the ship relative to G.

The landmarks L1 through L6 constitute the targets to be localized and used in determining the state vector of the ship 25. Information relative to these landmarks is recorded on a diskette which constitutes the target register on which the processor 20 operates.

The diskette is divided into two thousand 288-byte sectors, each of which suffices to characterize twelve landmarks. Twenty-four 8-bit bytes which characterize a single landmark are occupied as follows:
8 by the latitude and longitude;
4 by the identification of the landmark;
4 to identify territorial limits between which the particular landmark can be utilized, 2 by the landmark characteristics; and
6 by the landmark orientation and coefficient of quality.

The latitude and longitude are the defined in $2^{32}$ fractions of the earth's half circumference. The identification may be any convenient alphanumerical name of four characters. The limits of use define the area along the itinary of the ship from where the landmark is easily accessible to the radar equipment. The ,haracteristic most commonly associated with a landmark is an amplitude threshold applicable to the reception of the target echo signal. This information is used in the radar interface module 22 to reject all echo signals which do not rise above this threshold level. These features relieves the equipment from having to analyze a large amount of non-pertinent data.

The angle of orientation of the target $\beta$ is the angle between the North direction and the perpendicular to a line tangent to the surface of the landmark. This is particularly useful in identifying a shoreline, the edge of bluffs, a wall or any other elongated landmark. The coefficient of quality is to be taken in consideration when analyzing the topological data generated by the signals reflecting from the landmark.

As the ship progresses along the waterway, information data pertaining to certain landmarks are fetched from the diskette as soon as the landmark becomes accessible to the radar equipment, and are temporarily stored in a special register called target-ring whose operation will be discussed later. The fetching of the accessible landmarks is done as a function of the estimated position of the ship. For instance, as the ship 25 progresses from position P1 to position P3, landmarks L1, L3 and L2 become available; and landmarks L5 and L6 are no longer accessible and can be deleted from the target ring.

Figure 5:
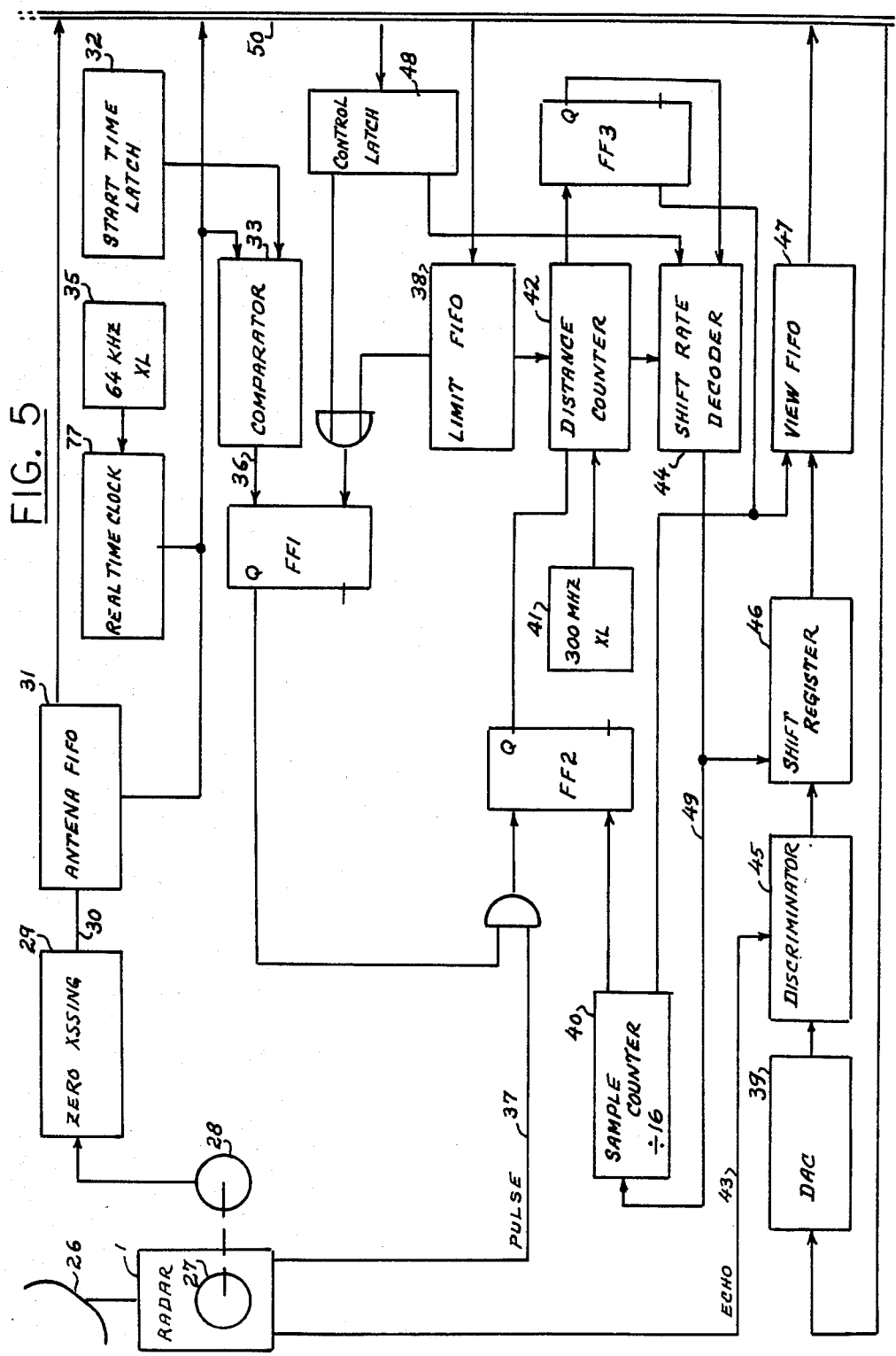
FIG. 5 is a functional block diagram of the radar interface module.

A block diagram of the radar interface module 22 is illustrated in FIG. 5. This module is principally designed for accumulating samplings of radar echo signals at a relatively fast rate of input; and thus relieve the processor 20 from the time-consuming task of monitoring the output of the radar 1. The module 22 is also useful in monitoring the exact orientation of the radar and recording it as an angle/time function. On a particular commercial radar which will now be taken up as an example, the motor 27 which drives the radar antenna 26 is coupled to a small alternator 28. The coupling is done by means of a geared-up linkage whereby the sinusoid delivered by the alternator has a much higher frequency than the rotation rate of the radar antenna 26. The alternator signal is run through a zero crossing detector circuit 29 and the resulting pulse train 30 is used to load into the antenna fifo 31 the time of the day obtained from real time clock 77. Accordingly, the values stored in fifo 31 correspond to the time at which the antenna 26 has reached a discrete angular increment in its revolving cycle. This information is fed to the processor bus 50.

Figure 6:
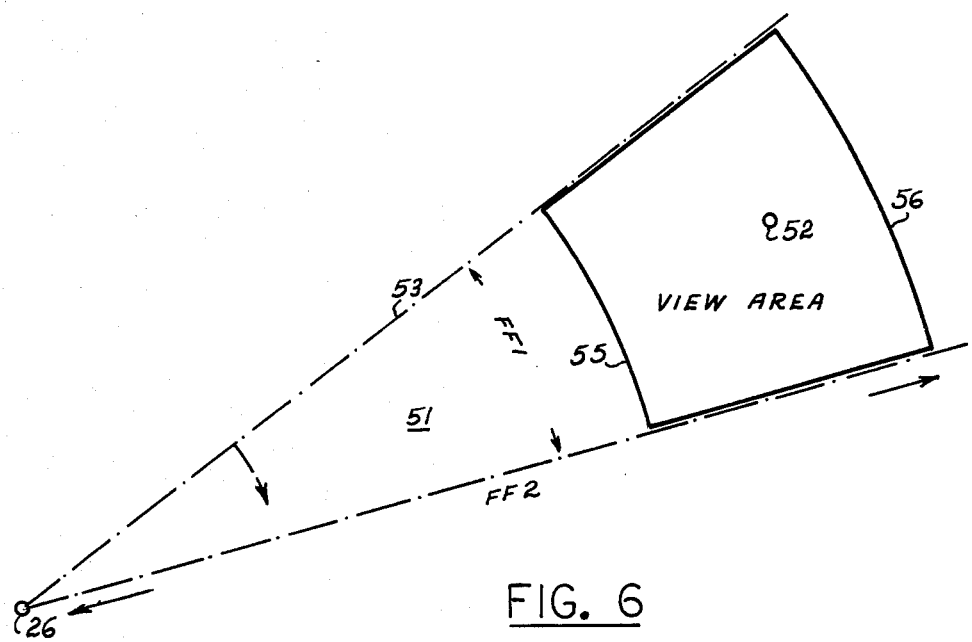
FIG. 6 is a diagram of the angular sector.

The processor correlates the radar antenna position with the time of the day in order to determine the starting time of the next recording sequence. The determination of a particular zone of observation is illustrated diagrammatically in FIG. 6. Once the processor has determined, as a function of the state vector, the general orientation of a selected target 52 in relation to the radar antenna 26, it provides to the radar interface module 22 a starting time corresponding to the left radial edge 53 of the angular scanning sector 51 in which the target 52 is to be found. The radar interface module circuit is then used to determine the right edge of the scanning sector 51 as well as the inner limit 55 and outer limit 56 of the observation zone approximately centered on the expected location of the target 52.

Figure 7:
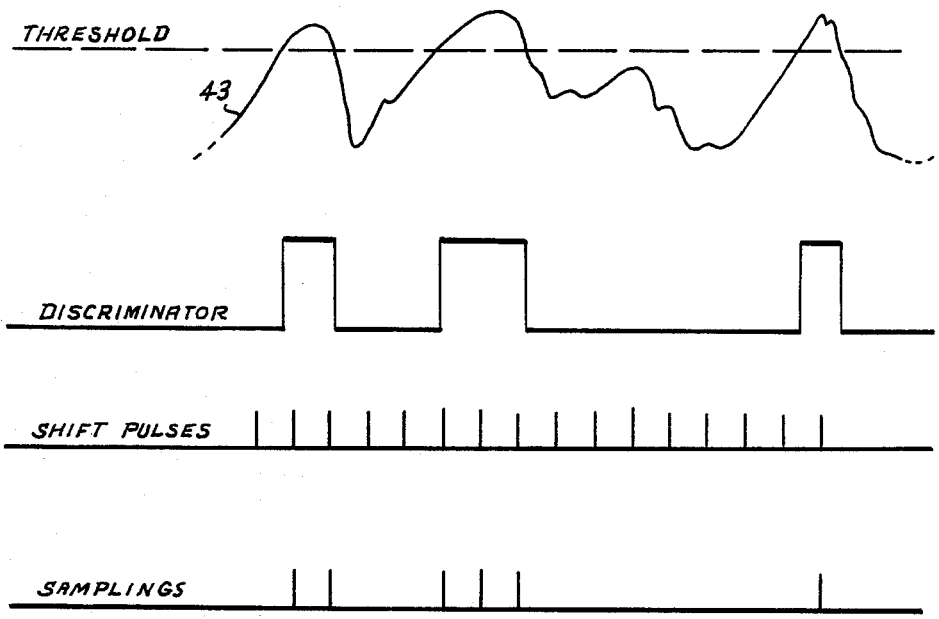
FIG. 7 is a waveform diagram of the radar echo signals through the amplitude discriminator.

The starting time is loaded into the start time latch 32 which feeds a comparator 33 receiving a time information from real time clock 77 driven by a 64 kiloherz oscillator 35. When the information held in the latch 32 corresponds to the count of clock 77, a coincidence signal 36 triggers flip-flop 1. The set time of the flip-flop 1 corresponds to the width of the angular sector 51. The Q output of flip-flop 1 allows the next radar pulse 37 to set flip-flop 2. The Q output of flip-flop 2 allows the distance counter 42 to accumulate counts from a 300 megahertz clock 41. The distance counter 42 is preset between each radar pulse with a count extracted from the limit fifo 38 which had been previously loaded by the processor. This preloaded count responds to the difference between the maximum count of the distance counter 42 and a count corresponding to the desired inner limit 55. When the counter reaches its maximum count, flip-flop 3 is set. The set time of flip-flop 3 corresponds to the time difference between the inner limit 55 and the outer limit 56 during which echo signals 43 for each radar pulse 37 will be accepted. The Q output if flip-flop 3 enables a shift rate decoder 44 which selects one of the outputs of the distance countdown counter 42 in accordance with instructions derived from the processor bus 50 and held in control latch 48. The output of the shift rate decoder 44 is a shift pulse signal 49 which is accumulated in sample counter 40. After sixteen shift pulse signals have been accumulated flip-flop 2 and flip-flop 3 are reset. The shift pulse signal 49 is used to advance a shift register 46 which records samples of echo signal 43 after it has been preconditioned by a discriminator 39. FIG. 7 is a waveform diagram illustrating the radar echo sampling process. The shift register 46 is preceded by an amplitude discriminator 45 which eliminates the part of the echo signals which fall below a particular threshold. This threshold is derived from information in the target register 2. The processor places the threshold data on the bus 50 in digital form. They are converted to analog values in a digital-to-analog converter 39. The discriminator delivers a squared signal which is applied to the control input of the shift register 46. At the end of each sixteen-count sampling, the contents of the shift register 46 is loaded into the view fifo 47 which can hold a complete multi-pulse view of the observation zone. Flip-flop 1 is cleared when the limit fifo 38 is found to be empty or upon direct command from the processor through a bit of the control latch 48.

Figure 8:
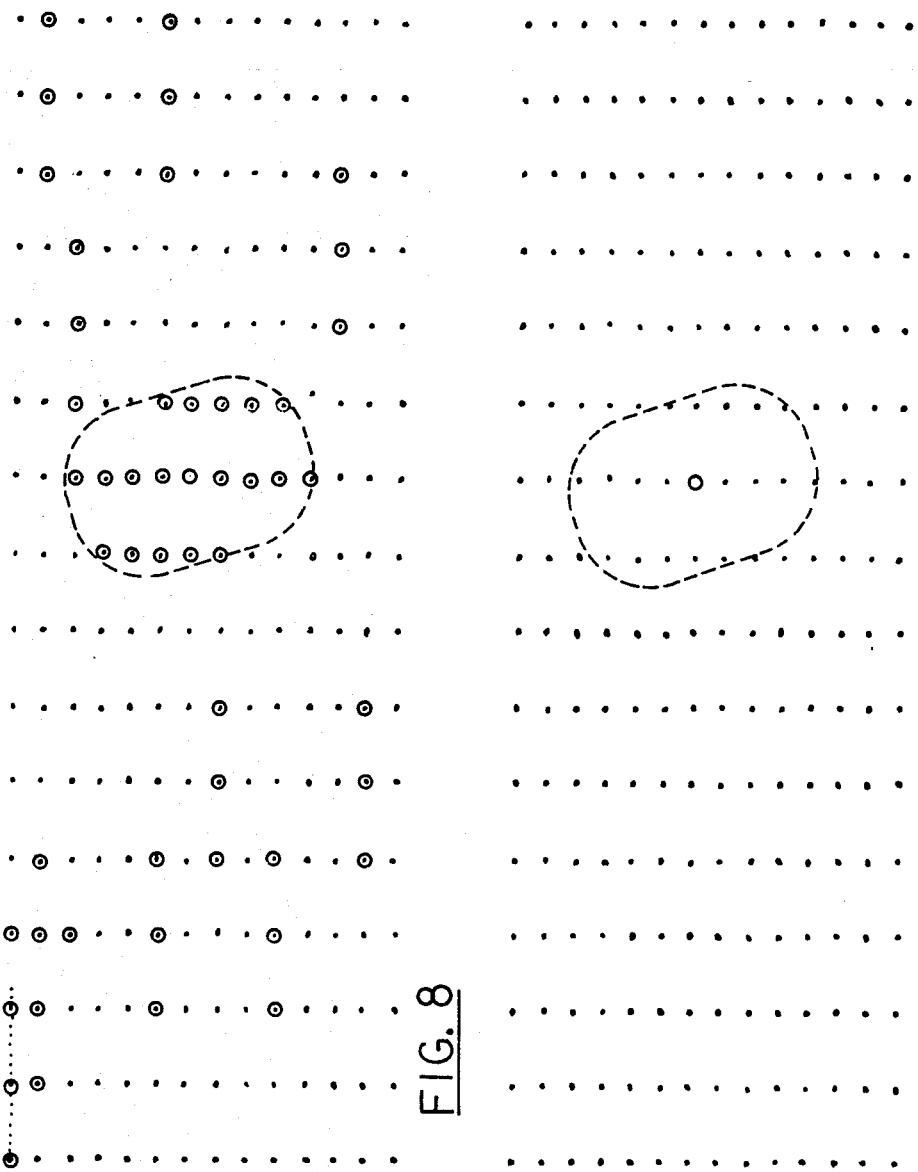
FIG. 8 is the diagram of an unprocessed view.

FIG. 8 illustrates a hypothetical array of echo signal samplings which would be recorded in the view fifo 47 at the end of a target scanning operation. Each dot in the array represents an empty location. Each circled dot represents a location where an echo sampling has been recorded. Each row contains samples corresponding to a particular pulse. Accordingly, the upper and lower rows correspond to the left and right limits of the angular scanning sector 51, the left column corresponds to the inner limit 55 and the right column corresponds to the outer limit 56 of the observation zone. Small dots in the upper left corner of the view represent discrete movements of the distance counter 42, thus indicating that the shift rate decoder 44 is programmed to advance the shift register 46 every eight counts.

Figure 9:
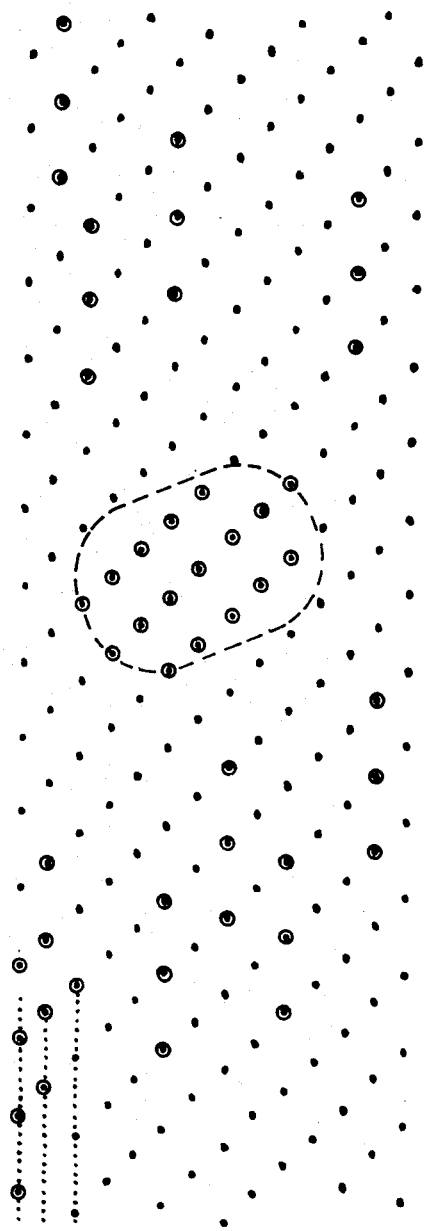
FIG. 9 is the diagram of an improved view.

FIG. 9 represents a preferred way of recording the echo signals into the view fifo 47 wherein the sampling sequence between successive rows has been shifted forward by three counts. This can be accomplished in incrementing the limit fifo contents by three octal counts between radar pulses.

The net effect is to scatter the topological data so that echo signals (samplings) are more uniformly distributed over zone of observation. This yields a finer view resolution and a more accurate delineation of the target image. The scattering of the samplings further allows a more efficient application of convolution techniques in order to de-blur the view and strip it of electrical noise and other spurious phenomena. In each figure, the area within the dotted line represents the echo image of the selected target obtained from the radar. All circled dots outside this area are presumed to be caused by noise.

Figure 11:
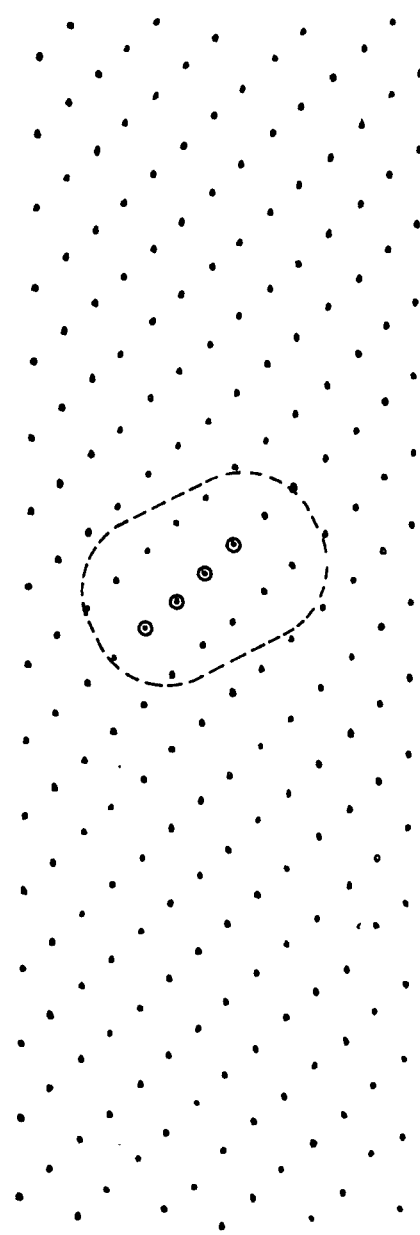

FIGS. 10 and 11 illustrate what remains of the views shown in FIGS. 8 and 9, respectively, when one eliminates all echo signals which do not dwell in the center of the echo pattern illustrated in FIG. 12. One notes that in both cases, the convolution method was very effective in suppressing all parasitic signals. However, the image which remains in FIG. 11 is a more accurate representation of the slanted and oblong target than the single dot remaining in FIG. 10.

While the acquisition of echo signals corresponding to the zone sampling process 9 of FIG. 2 is done in real time in the radar interface module 22, the view enhancement by convolution technique and other processes are accomplished by the processor through a series of tasks which do not require any further specialized hardware but can be readily programmed into a common microprocessor.

One of the basic ideas of the present invention is to make successive corrections to the state vector by looking at a very small number of targets at a given instant so that the target register may be as concise and as economical as possible to prepare. The use of a very small number of targets also reduces the volume of calculation. By contrast to the simplicity of the equipment necessary to practice the invention, it is necessary to use a highly sophisticated method of processing in order to optimize the results obtained from such a small number of measurements.

The various tasks performed by the processor may be grouped into three general categories.

The first group relates to the process of acquisition of topological data. The second group comprises the various corrective and enhancing processes applied to said data. The third and last group relates to the interpretation of the data and its application to the correction of either the state vector 4 or 5 or the target register 2.

On the basis of the foregoing, it can be understood that at the end of the first category of tasks, the processor has at its disposal an image of the zone which has been scanned in the form of a series of radar echo signal samplings or marks forming an image of the type illustrated in FIG. 9. The second group of tasks has for an objective the enhancement of the acquired data by eliminating spurious marks and making adjustments necessary to compensate for any variation in the scanning rate of the radar antenna.

During the last series of tasks, each mark is interpreted as a potential change in the position of the craft or in the location of the selected target and corrections are made accordingly.

Once a view of the target zone has been acquired, the interpretation and application processes consist of defining the mean location of the target or position odf the craft by averaging the deviation from the expected location or position represented by a multitude of diverging echo signal samplings which are all assumed to be reflections from the selected target. It care is taken to center the observation zone around the estimated location of the selected target, one is justified to rely more on those marks which are closest to the center of the view than upon those which are scattered near its periphery. Accordingly, it is advantageous to weight each deviation as a function of the distance from the corresponding mark to the center of the view. In the present embodiment, the data relative to a sampling is multiplied by $1-(x/a)^2-(y/b)^2$ wherein x and y are the position coordinates of the mark relative to the center of the view, and a and b are the maximum absolute values of x and y, respectively, within the confines of the observation zone.

In the process illustrated as loop A in FIGS. 1 and 2 wherein no motion of the target is expected between measurements, the correction to be applied to the location of the target can be derived by recursive least-squares approximation of the weighted average of the samplings deviation from the center of the view.

In the process illustrated through loop B or loops BC of FIGS. 1 and 2 where the movement of the craft or the target requires a more complex type of measurement interpretation. The weighted average of echo sampling deviation (mean target location deviation) is fed into the continuous-time filter which updates those state vector components which, according to the coefficient vector, need to be corrected.

Figure 13:
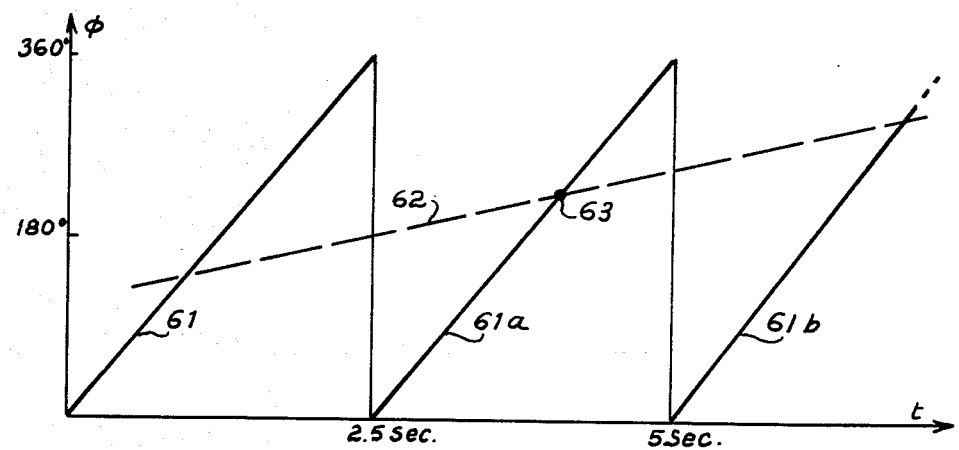
FIG. 13 is the diagram of the antenna function.

Among the first group tasks to be performed by the processor is the determination of the staring time for the next recording sequence as a function of the past movement of the antenna 26 which has been accumulated in the antenna fifo 31. In addition to the movement of the antenna, the computation must take into account the actual movement of the target, if any, and/or the apparent movement of the target due to the movement of the craft on which the radar antenna 26 is located. A graphic illustration of these calculations is illustrated in FIG. 13. Line 61 represents the bearing-versus-time function of the antenna movement obtained by plotting the time contents of antenna fifo 31 against angular increments corresponding to the period of the pulse train used to load the antenna fifo 31. Lines 61a and 61b are extrapolated from line 61 and represent the anticipated movement of the radar antenna 26 during its next two revolutions. Line 62 corresponds to the apparent movement of the landmark in relation to the location of the radar antenna. This line is derived from the instantaneous values of the state vector components and from the known position coordinates of the target. The intersection 63 of line 61a and line 62 corresponds to the anticipated angular orientation and timing of the antenna 26 at which the target will be found during the next revolution of the antenna. The left angular edge of the angular sector 51 is obtained by subtracting from the angular position corresponding to intersection 63 one half of the desired width of the angular sector 51. These primary determinations of the angular sector from which the scanning zone surrounding the target is to be determined, is subject to errors due to variations in the rotational speed of the antenna. Any such variation would result in finding the target at a point which does not correspond to the exact center of the angular sector 51.

It has been found convenient to realign the angular sector 51 after the antenna has completed its scan of the target zone. At that point the actual movement of the antenna during the period in which the view was taken is stored in the antenna fifo 31. A view such as the one illustrated in FIG. 9 can thus be recentered by recomputing the point of intersection between line 62 and the line corresponding to the actual recorded movement of the antenna during the view-taking period. Such a correction eliminates, in fact, any mechanical defect in the movement of the radar antenna 26 and establishes as a new center point for the view the best location obtained from the target register and from the last value of the state vector estimate.

The third and last series of tasks assigned to the processor is the interpretation of the data derived from the observation of the target and its application to the correction of either the state vector or the target register. The least squares approximation method used for updating the target register in accordance with loop A of FIG. 2 is a well-known method whose principles are well-documented in Linear Least Square Estimations by Thomas Kailath, Dowden, Hutchinson & Ross, Inc., 1977.

The updating of the state vector illustrated in Loops B and C of FIG. 2 takes into account not only the topological data constituted by the various weighted and averaged samplings of the echo signal but also frequent inputs from a gyroscope 76 which monitors the rotational movement of the craft. It includes also time updates in reference to a real time clock 77. The continuous time filter methods used on the state vector such as a KALMAN filter or SRIF filter are extensions of classical least-squares estimations. This method, while not as common as least square estimations, also are within the knowledge of those skilled in the art. Continuous-filter methods are expounded in Stochastic, Models, Estimations and Controls by Peter S. Maybeck, Academic Press, 1979; and Factorization Methods for Discrete Sequential Estimations by Gerald J. Bierman, Academic Press, 1977.

The IEEE Standard Dictionary of Electrical and Electronic Terms, Second Edition, defines State Vector as a vector whose components are the state's variables, i.e., the minimum number of parameters which completely specify the system.

In the case of a craft such as the ship 25 of FIG. 4, the state vector can be defined as a function of the cartesian coordinates X and Y of the ship, its attitude or heading $\alpha$ and their corresponding speeds $\dot{X}, \dot{Y}, \dot{\alpha}$.

It should be noted that in spite of the fact that the state vector is periodically updated as a function of the real time clock 77, its components at any instant are always related to a specific reference time (whether past, present or future), at which these components were or will be correct. For example, when the processor analyzes the mean deviation obtained from the recording of a target view, it must relate the interpretation of the data to the values of the state vector at the time the target was scanned. Accordingly, the state vector must be looked at as a function of its reference time.

When the echo samplings are used to update the location of a target in accordance with the process of Loop A or Loop C, the state vector 5 of the craft is assumed to be exact ($\Delta X = \Delta Y = 0$). The partial derivatives of the target location function in relation to the target coordinates $\delta f/\delta x$ and $\delta f/\delta y$ are the "observation partials", i.e., the components of the coefficient vector which must be entered into the least-squares approximation process in order to update the xy coordinates of the target.

When the echo samplings are used to pinpoint the craft state vector, the location coordinates of the target are assumed to be exact ($\Delta x = \Delta y = 0$). the partial derivatives of the craft location function in relation to the craft coordinates $\delta f/\delta X$ and $\delta f/\delta Y$ then become the "observation partials".

In a combination of Loops B and C application both sets of partial derivatives alternately constitute the components of coefficient vector.

The difference $\Delta r$ between expected distance from the craft to the target and the distance indicated by the echo samplings is a function of all the partial derivatives:

$$\Delta r = \frac{\delta f}{\delta x} \Delta x + \frac{\delta f}{\delta y} \Delta y + \frac{\delta f}{\delta X} \Delta X + \frac{\delta f}{\delta Y} \Delta Y + \ldots$$

The value $\Delta r$ can thus be used to determine the component of the coefficient vector as explained below, by reference to FIG. 4.

Assuming that the ship 25 is at the position P3, and the radar R is scanning the landmark L2 which could represent the face of a building, the coordinates x and y of L2 are obtained from the target register. The coordinates X and Y of the center of gyration J and the heading $\alpha$ of the ship are defined by the state vector. The theorical distance r between the radar and target and the corresponding angle $\theta$ can be deduced therefrom. Once the landmark L2 has been scanned, one can derive for each sampling position extracted from the view fifo variations $\Delta r$ and $\Delta \theta$. The average difference z between th expected position of the landmark L2 and the position represented by the recorded marks may be expressed as follows.

$$\bar{z} = \frac{\sum\limits_{o}^{n} z}{n} \text{ with } z = \cos(\gamma - \beta)\Delta r - r\sin(\gamma - \beta)r\Delta\theta;$$

wherein $\gamma$ is the bearing of the landmark and $\beta$ is the angle between the direction of the North N and the perpendicular to the surface of the landmark L2.

In matrix form, the difference can be written:

$$z = \begin{bmatrix} \cos(\gamma - \beta) \\ -r\sin(\gamma - \beta) \end{bmatrix}^T \begin{bmatrix} \Delta r \\ \Delta \theta \end{bmatrix}$$

Now, the relationship between ($\Delta r$, $\Delta \theta$, and $\Delta X$ and $\Delta Y$ and $\Delta \alpha$ may be written:

$$\begin{bmatrix} \Delta r \\ \Delta \theta \end{bmatrix} = G \begin{bmatrix} \Delta X \\ \Delta Y \\ \Delta \alpha \end{bmatrix}$$

where X,Y and $\alpha$ are values corresponding to the time at which the echo samplings are taken.

The relationship between $\Delta r$ $\Delta \theta$ and the differentials of the state vector components may be written:

$$\begin{bmatrix} \Delta r \\ \Delta \theta \end{bmatrix} = G \begin{bmatrix} \Delta X + \tau \Delta \dot{X} \\ \Delta Y + \tau \Delta \dot{Y} \\ \Delta \alpha + \tau \Delta \dot{\alpha} \end{bmatrix}$$

where $$G \begin{bmatrix} \sin\gamma & \cos\gamma & a\sin(\gamma - \alpha) \\ \cos\gamma & -\sin\gamma & r - a\cos(\gamma - \alpha) \end{bmatrix}$$

with $a = \overline{RJ}$ and $\tau$ is the time difference between the reference time of the state vector and the time at which the samplings were taken. Thus, $$z = \begin{bmatrix} \cos(\gamma - \beta) \\ -r\sin(\gamma - \beta) \end{bmatrix}^T [[G] \tau X [G]] \begin{bmatrix} \Delta X \\ \Delta Y \\ \Delta \alpha \\ \Delta \dot{X} \\ \Delta \dot{Y} \\ \Delta \dot{\alpha} \end{bmatrix} = \lambda^T \begin{bmatrix} \Delta X \\ \Delta Y \\ \Delta \alpha \\ \Delta \dot{X} \\ \Delta \dot{Y} \\ \Delta \dot{\alpha} \end{bmatrix}$$

The vector $$\lambda = G^T \begin{bmatrix} \cos(\gamma - \beta) \\ -r\sin(\gamma - \beta) \end{bmatrix}$$

is the coefficient vector of observation partials. Its components are calculated by the processor according to the measurement results represented by the view data. In the case when the reflecting target is an isolated punctual relfector, two measures can be obtained by making, the angle $\beta$, in one case, equal to $\gamma$ and equal to $\gamma - \pi/2$ in the other case.

The deviation X is interpreted as a function of vector $\lambda$ by the continuous-time filter 6 or 7 to correct the components of the state vector 4 or 5.

The update of the state vector 4 or 5 is effected by operating on the matrix which characterizes the components of the state vector. This matrix may be the matrix Ak of the covariances, the inverse of the matrix Ak (generally called information matrix), a triangular "square root" of one of these two matrices, or any matrix deducted from the matrix Ak of the covariances by a matrix conversion. Updating methods vary according to the matrix adopted but the function of the matrix is always to represent the probable errors on the knowledge of the state vector x.

Time updates of the state vector components are done according to the following method. Between two consecutive instants $t_k$ and $tk+1$ separated by a unit of time, the state vector $x_{k+1}$ is derived from the state vector xk by multiplying this latter by a matrix such that $K_{k+1} = Px_K$ in which:

$$P = \begin{bmatrix} 1 & 0 & 0 & 1 & 0 & 0 \\ 0 & 1 & 0 & 0 & 1 & 0 \\ 0 & 0 & 1 & 0 & 0 & 1 \\ 0 & 0 & 0 & 1 & 0 & \dot{Y} \\ 0 & 0 & 0 & 0 & 1 & -\dot{X} \\ 0 & 0 & 0 & 0 & 0 & 1 \end{bmatrix}$$

And matrix $A_{k+1}$ is extrapolated from matrix $A_k$ by: $A_{k+1} = PA_kP^T + B$ in which expression: $P^T$ is the transposed matrix of P, and in which B is a constant matrix. Such a revision of the coordinates X, Y and $\alpha$ of the vehicle may be effected systematically, for example, every two or three seconds.

Figure 14:
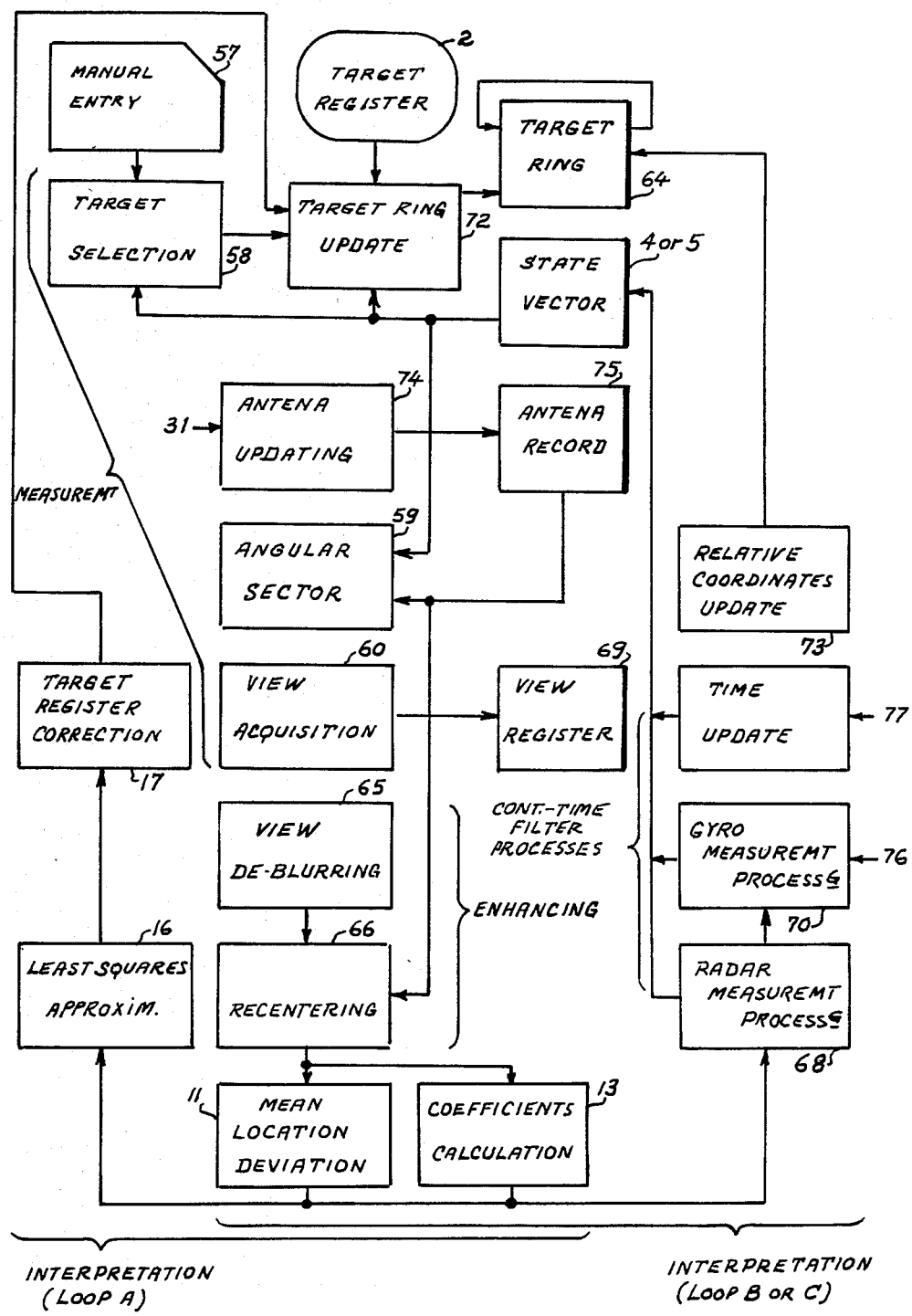
FIG. 14 is the functional block diagram of the processor tasks.

Referring now to FIG. 14, the various tasks of the processor are shown grouped in their three major categories. The computer is used in a multi-tasking mode in which each task or process has to compete with other tasks for processor time. Different degrees of priorities are assigned to the various processes and some of them may not be served by the processor until a particular event occurs which causes an interrupt to be placed on the common data bus and tells the processor to attend to a particular process. A commercial multi-tasking operating system is sufficient to arbitrate between competing tasks, in accordance with directions given by the program.

The first group of tasks labeled measurements includes selection of targets 58 in function of the craft's location as indicated by the state vector 5. The data from the selected targets is fetched from the target register and placed in a target ring 64 where each target can be accessed sequentially as they appear in the scanning revolution of the radar. Data pertaining to targets that are no longer accessible from the instant location of the ship are removed from the target ring to leave room for data pertaining to new targets as they become accessible during the ship's progress along the waterway. Provision is also made for manually selecting a target in the absence of a state vector indicator of actual position. This feature is particularly useful in priming the system or in performing a rapid re-orientation in case of suspicious behavior.

The manual entry 57 for directing the system to scan a particular target may be effected by means of an optical pencil applied against the face of the radar scope over that part of the radar image corresponding to the selected target. A view acquisition is triggered every time the optical pencil is impinged upon by the radar beam. A keyboard entry could also be implemented whereby the operator enters data corresponding to the estimated location of the selected targets. Both of these techniques are well known to those skilled in the art.

The target ring 64 is a closed "linked list" which is subdivided into frames. A frame may contain not only the target information derived from the target register 2 but also additional information obtained from the state vector and other data necessary to perform a particular task. For instance, a frame may contain the target coordinates derived from the target register, the parameters necessary for determining the angular sector 51 encompassing the target and the data to be entered into the limit fifo 38 which specifies the observation zone. The frame will also hold the polar coordinates of the target relative to the location of the ship for the particular state vector reference time at which the measurement is to be taken. The frame may also carry a pointer designating the next frame which is to be used by the processor. The processor uses information contained in such a frame to perform the angular sector selection task 59 and view acquisition task 60. The view register 69 is another link-list device in which are recorded not only the array of marks coming from the view fifo 47 but also data particular to the recording circumstances such as the first and last radar pulse times and an indication as to whether that particular view has already been processed.

The lowest processing priority is assigned to the target ring update 72 which extracts from the target register data belonging to the target accessible from the present position of the ship along the waterway. The next degree of priority is given to the relative coordinate update 73. This task waits for a signal from the continuous time filter 4 or 5 indicating that the state vector has just been updated. It then computes and places in all frames new values for each target's polar coordinates relative to the components of the state vector, the time derivatives of those coordinates and a start time for the corresponding angular sector, as well as the applicable state vector reference time.

The antenna updating task 74 which consists in unloading the antenna fifo 31 into the antenna record register 75 is performed whenever an interrupt is sensed from the radar interface module, indicating that the fifo 31 is full; and when the processor issues a software interrupt indicating that one one of the processes needs the latest available news on the antenna motion. The antenna updating task also involves a recomputation of the antenna period. The task of angular sector selection 59 involves the selection of the appropriate frame, the computation of the angular sector start time as illustrated in FIG. 13, and the loading of the limit fifo 38 and control latch 48 in the radar interface module. It may be practical to design the radar interface module so that two or more target views may be sampled while the processor is busy on some other task. The enhancing and interpretation tasks have medium priority.

The enhancing process comprises the view de-blurring 65, the view recentering 66. The de-blurring is done by operating on the view register 69 and applying a convolution technique such as the one illustrated in FIGS. 8 through 12. The recentering of the view is done as a function of the antenna record 75.

The interpretation process comprises the computation of the mean location deviation and coefficient vector. The mean deviation is computed by multiplying the change in the expected target location corresponding to the position of each sampling mark within the view by the weighting factor, then averaging the result to obtain a mean deviation.

In a loop A operation, the mean deviations and coefficient vectors obtained from a series of measurements are processed by means of least squares approximation 16 and the result is used to correct the target coordinates in the target ring 64, then returning it to the target register 2.

In a Loop B or Loop C application, the mean deviation is used to calculate corresponding deviations for the components of the state vector, from which the error vector calculation 13 is made according to the process described earlier.

At the next level of priority are the continuous-time filter operations, including the state vector correction 68 and 70 and state vector update 71 which have been described earlier. The interface tasks (antenna updating view acquisition) are given top priority among all the programmed tasks.

While the preferred embodiment of the invention has been disclosed and variations have been suggested, it should be understood that other embodiments may be implemented and modifications may be made thereof without departing from the spirit of the invention and the scope of the appended claims.

What is claimed is:

1. A device, for pinpointing the position of a mobile locus within an area in relation to the location of at least one known sendentary locus, in response to signals generated by a radar apparatus associated with said mobile locus and surveying said area, when said radar apparatus is targeted on a topological feature characterizing said sendentary locus, comprising:
    means for storing in machine-readable form a first set of data relative to the location characteristics of the sendentary locus;
    means for holding a second set of data having variable factors relative to the state vector of the mobile locus;
    means for defining the expected relative location of the targeted locus as a function of said first and second sets of data;
    means for acquiring a view of said expected relative location, said means for acquiring including means for calculating the radar scanning time limits of an observation window outlining a scanning zone centered on said expected location, said observation window being narrowly circumscribed about the targeted locus; for selectively accepting reflecting signals from the radar apparatus corresponding to topological features within said scanning zone, said means being adjusted to eliminate reflecting signals from objects other than the targeted locus; for generating from said reflecting signals an array of marks and for placing said marks in said array in a topological arrangement representing the respective origins of said reflecting signals within said scanning zone;
    means for enhancing said arrangement by eliminating spurious marks from said array;
    means for estimating the difference between the expected relative location of the targeted locus and the location corresponding to the position of the marks in said array, said means for estimating including means for determining the mean deviation between the center of said zone and the locations of origin of the reflective signals indicated by the marks remaining in the array, and means for computing correction coefficients based upon the observation partials corresponding to the rate of change of the variable factors of said second set of data, said observation partials being computed as a functions of the deviation indicated by each of said remaining marks from the center of said scanning zone; and
    means for continuously and repetitively updating said second set of data as a function of said mean deviation and of said correction coefficients.

2. The device of claim 1 wherein said means for calculating the radar antenna scanning time limits of and obsevation window comprises:
    means for defining the bearing-versus-time scanning cycle function of the radar antenna in relation to past scanning cycles and the apparent movementversus-time function of the targeted locus due to the motion of the radar apparatus; and for calculating the next coincidence time of said bearing-versus-time function and apparent movement-versus-time-function.

3. The device of claim 2 wherein said means for determining the mean deviation comprises means for redefining the outline of said zone as a function of the radar apparatus scanning positions recorded while said reflecting signals were being accepted.

4. The device of claim 3 wherein said means for determining the mean deviation further comprises means for calculating the actual time of coincidence between the recorded bearing-versus-time function of the radar apparatus scanning position and the recorded apparent movement-versus-time function of the targeted topological feature in relation to the radar apparatus.

5. The device of claim 2 wherein said means for determining the mean deviation comprises means for assigning to each mark a weight according to the formula:

$$w = 1 - (x/a)^2 - (y/b)^2$$

wherein x and y are the position coordinates of the mark relative to the center of the zone, and a and b are the maximum values of x and y, respectively.

6. The device of claim 1 wherein said means for enhancing comprises:
means for symmetrically shifting strings of marks within the resolution limits of the scanning apparatus; and
for deleting marks in inverse relation to their correlation to other marks.

7. The device of claim 6 wherein:
said means for enhancing further comprises means for shifting the sampling time between successive rows of marks and for eliminating marks which do not fall within a pattern associated with any other mark.

8. The device of claim 2 or claim 5 wherein said means for updating comprises;
means for calculating the probable position of said mobile locus at the time said reflective signals were being accepted, and for interpreting said mean deviation, said correction coefficient, timing information and indications about the rotational motions of said mobile locus.

9. The device of claim 8 wherein:
said radar apparatus is mounted on board a craft traveling through said area along a tightly defined itinerary having a plurality of spaced-apart distinctive topological features along and adjacent to said itinerary, wherein at least one of said features is at any time within the range of the radar apparatus, as the craft progresses along said itinerary;
said features constituting a plurality of known sedentary loci;
said first set of data including location characteristics of some of said plurality of sedentary loci; and
said means for defining the expected location of the targeted locus comprising means for selectively and sequentially loading said means for storing with location characteristics of topological features as they appear within the range of the apparatus.

10. The device of claim 9 wherein said craft is a ship traveling along a waterway crossing said area; and said mobile locus is the axis of gyration of the ship in response to the action of its rudder.

11. The device of claim 8 wherein said means for continuously keeping information and for interpreting measurement functions comprises a continuous-time filter-type circuit.

12. The device claimed in claim 5 wherein said means for defining the expected relative location of the target comprises means for continuously keeping information defining the state vector of said target; and which further comprises means for updating the state vector components of said target in function of said mean deviation and of said correction coefficients.

13. A device for defining the state vector of a mobile locus within an area in relation to the location of a sendentary locus, in response to signals generated by a radar apparatus associated with said sendentary locus and surveying said area comprising:
means for storing in machine readable form a first set of data relative to the location characteristics of the sendentary locus;
means for holding a second set of data having variable factors characterizing the state vector of the mobile locus;
means for defining the expected relative location of the mobile locus as a function of said first and second sets of data;
means for acquiring a view of said expected relative location, said means for acquiring including means for calculating the radar scanning time limits of an observation window outlining a scanning zone centered on said expected location, said observation window being narrowly circumscribed about the mobile locus; for selectively accepting reflecting signals from the radar apparatus corresponding to echo-generating features within said scanning zone while eliminating reflecting signals from objects other than the mobile locus; for generating from said reflecting signals an array of marks, and for placing said marks in said array in a map-like arrangement representing the respective origins of said reflecting signals within said scanning zone;
means for enhancing said arrangement by eliminating spurious marks from said array;
means for estimating the difference between the expected relative location of the mobile locus and the location corresponding to the position of the marks in said array, said means for estimating including means for determining the mean deviation between the center of said zone and the locations of origin of the reflective signals indicated by the marks remaining in the array and means for computing correction coefficients based upon the partial derivatives corresponding to the rate of change of the variable factors of said second set of data, said partial derivatives being computed as function of the deviation indicated by each of said remaining marks from the center of said scanning zone; and
means for continuously and repetitively updating said second set of data as a function of said mean deviation and of said correction coefficients.

14. The device of claim 13 wherein said means for calculating the radar scanning time limits of an observation window comprises means for defining the bearing-versus-time scanning cycle function of the radar antenna in relation to past scanning cycles and the movement-versus-time function of the mobile locus, and for calculating the next coincidence time of said bearingversus-time function and movement-versus-time function.

15. The device of claim 14 wherein said means for determining the mean deviation comprises means for redefining the outline of said zone as a function of the radar antenna scanning positions as recorded while said reflecting signals were being accepted.

16. The device of claim 15 wherein said means for determining the mean deviation further comprises means for assigning to each mark a weight according to its distance from the center of said zone.

17. The device of claim 13 wherein said means for enhancing comprises:
 means for symmetrically shifting strings of marks within the resolution limits of the radar apparatus, and for deleting marks in inverse relation to their correlation to other marks.

18. The device of claim 17 wherein said means for enhancing further comprises, means for shifting the sampling time between successive rows of marks and for eliminating marks which do not fall within a pattern associated with any other mark.

* * * * *